(12) United States Patent
Carvell

(10) Patent No.: US 11,088,644 B1
(45) Date of Patent: *Aug. 10, 2021

(54) PULSED ELECTRIC MACHINE CONTROL

(71) Applicant: Tula eTechnology, Inc., San Jose, CA (US)

(72) Inventor: Paul Carvell, San Jose, CA (US)

(73) Assignee: Tula eTechnology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/188,189

(22) Filed: Mar. 1, 2021

Related U.S. Application Data

(63) Continuation of application No. 16/866,917, filed on May 5, 2020.

(51) Int. Cl.
 *H02P 1/30* (2006.01)
 *H02P 23/04* (2006.01)
 *H02P 27/08* (2006.01)

(52) U.S. Cl.
 CPC ............ *H02P 23/04* (2013.01); *H02P 27/085* (2013.01)

(58) Field of Classification Search
 CPC ......... H02P 23/04; H02P 27/085; H02P 27/08
 See application file for complete search history.

(56) References Cited

U.S. PATENT DOCUMENTS

| | | | |
|---|---|---|---|
| 5,325,028 A | 6/1994 | Davis | |
| 6,906,485 B2 | 6/2005 | Hussein | |
| 8,773,063 B2 | 7/2014 | Nakata | |
| 10,060,368 B2 | 8/2018 | Pirjaberi et al. | |
| 10,742,155 B2* | 8/2020 | Tripathi | H02P 27/08 |
| 10,944,352 B2 | 3/2021 | Mazda et al. | |
| 2009/0146615 A1 | 6/2009 | Zillmer et al. | |
| 2013/0134912 A1 | 5/2013 | Khalil et al. | |
| 2014/0265957 A1 | 9/2014 | Hu et al. | |
| 2014/0292382 A1 | 10/2014 | Ogawa et al. | |
| 2019/0288629 A1 | 9/2019 | Tripathi | |
| 2019/0288631 A1 | 9/2019 | Tripathi | |
| 2020/0262398 A1* | 8/2020 | Sato | B60T 8/17555 |

FOREIGN PATENT DOCUMENTS

JP    10243680    9/1998

OTHER PUBLICATIONS

Cai et al., "Torque Ripple Reduction for Switched Reluctance Motor with Optimized PWM Control Strategy", https://www.mdpi.com/1996-1073/11/11/3215, Oct. 15, 2018, 27 pages.

(Continued)

*Primary Examiner* — Karen Masih
(74) *Attorney, Agent, or Firm* — Beyer Law Group LLP

(57) ABSTRACT

A variety of methods, controllers and electric machine systems are described that facilitate pulsed control of electric machines to improve the energy efficiency of the electric machine when conditions warrant. Selected transitions between pulsing output levels are controlled to provide a cubic or higher order transition torque profile. In various implementations, cubic, quintic or higher order transition profiles are use. The use of such transition torque profiles can improve NVH characteristics of the electric machine while providing energy efficient pulse transitions.

21 Claims, 9 Drawing Sheets

(56) References Cited

OTHER PUBLICATIONS

Spong et al., "Feedback Linearizing Control of Switched Reluctance Motors", IEEE Transactions on Automatic Control, vol. AC-32, No. 5, May 1987, pp. 371-379.
Carvell, U.S. Appl. No. 16/866,917, filed May 5, 2020.
International Search Report and Written Opinion dated Jun. 4, 2021 from International Application No. PCT/US2021/017379.
Mirzaeva et al., "The use of Feedback Quantizer PWM for Shaping Inverter Noise Spectrum", Power Electronics and Motion Control Conference (EPE/PEMC), 2012 $15^{th}$ International IEEE, Sep. 4, 2012, pp. DS3c. 10- 1, XP032311951, DOI: 10.1109/EPEPEMC.2012.6397346, ISBN: 978-1-4673- 1970.6.
Luckjiff et al., "Hexagonal Ea Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.

\* cited by examiner

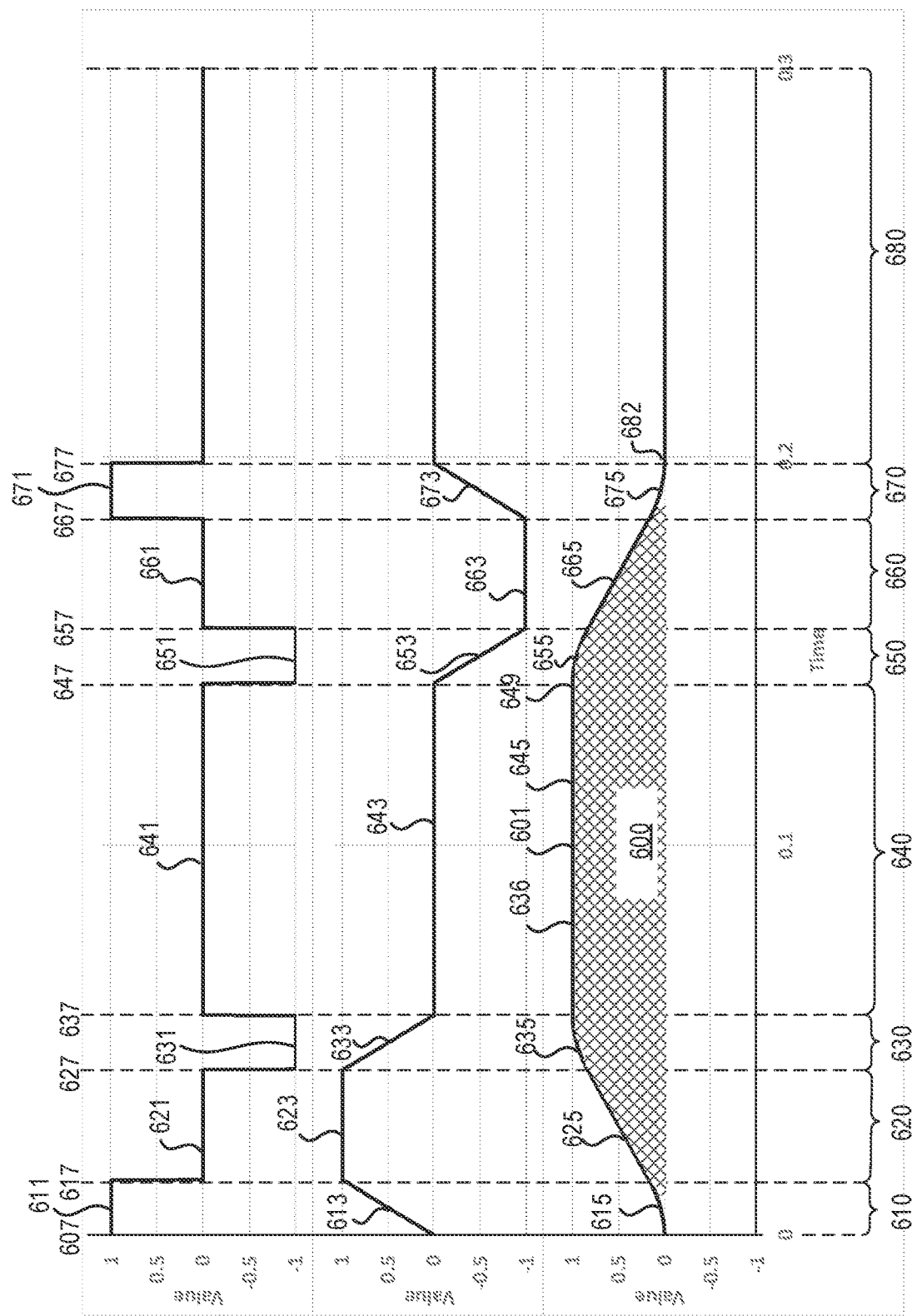

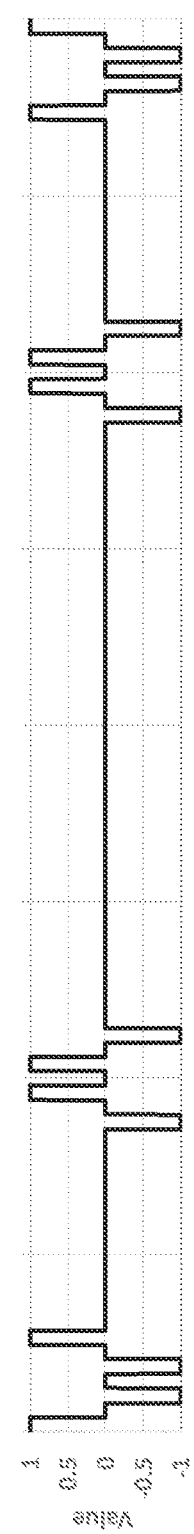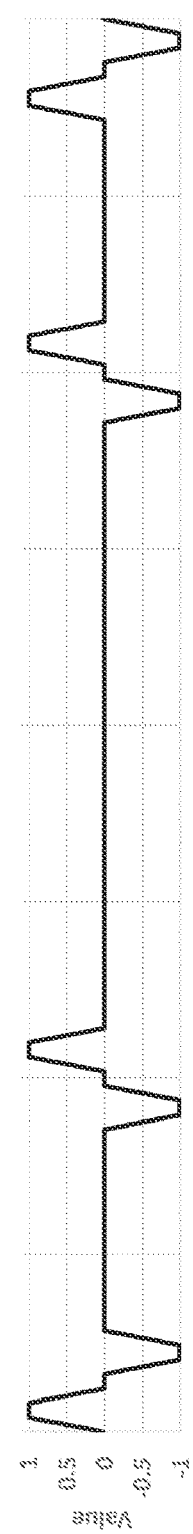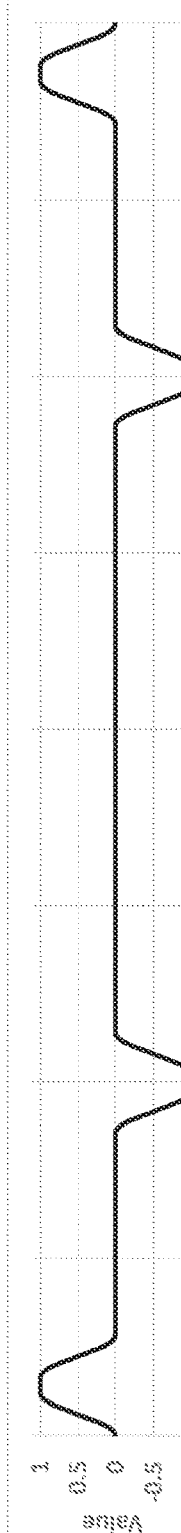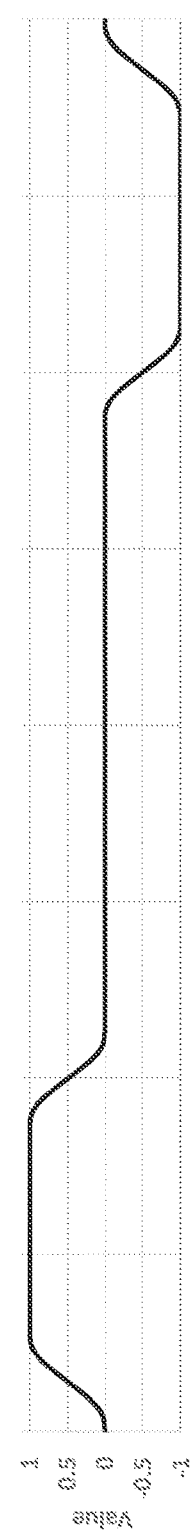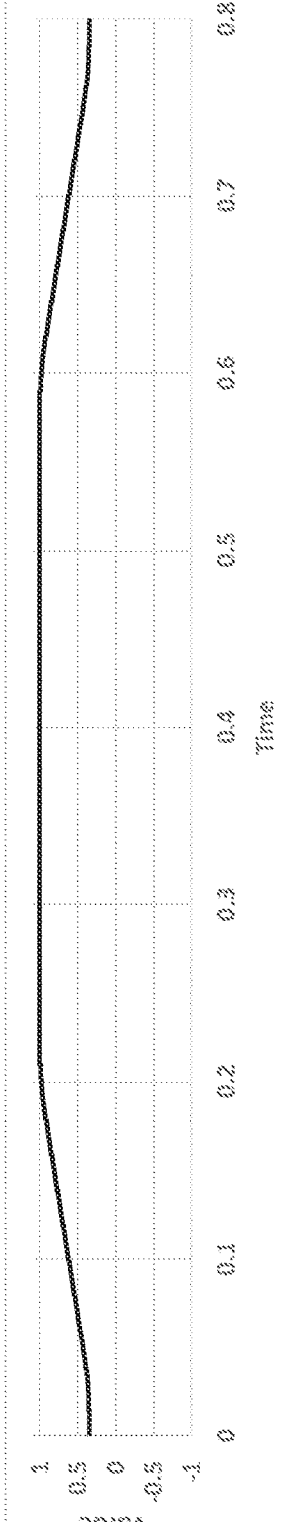

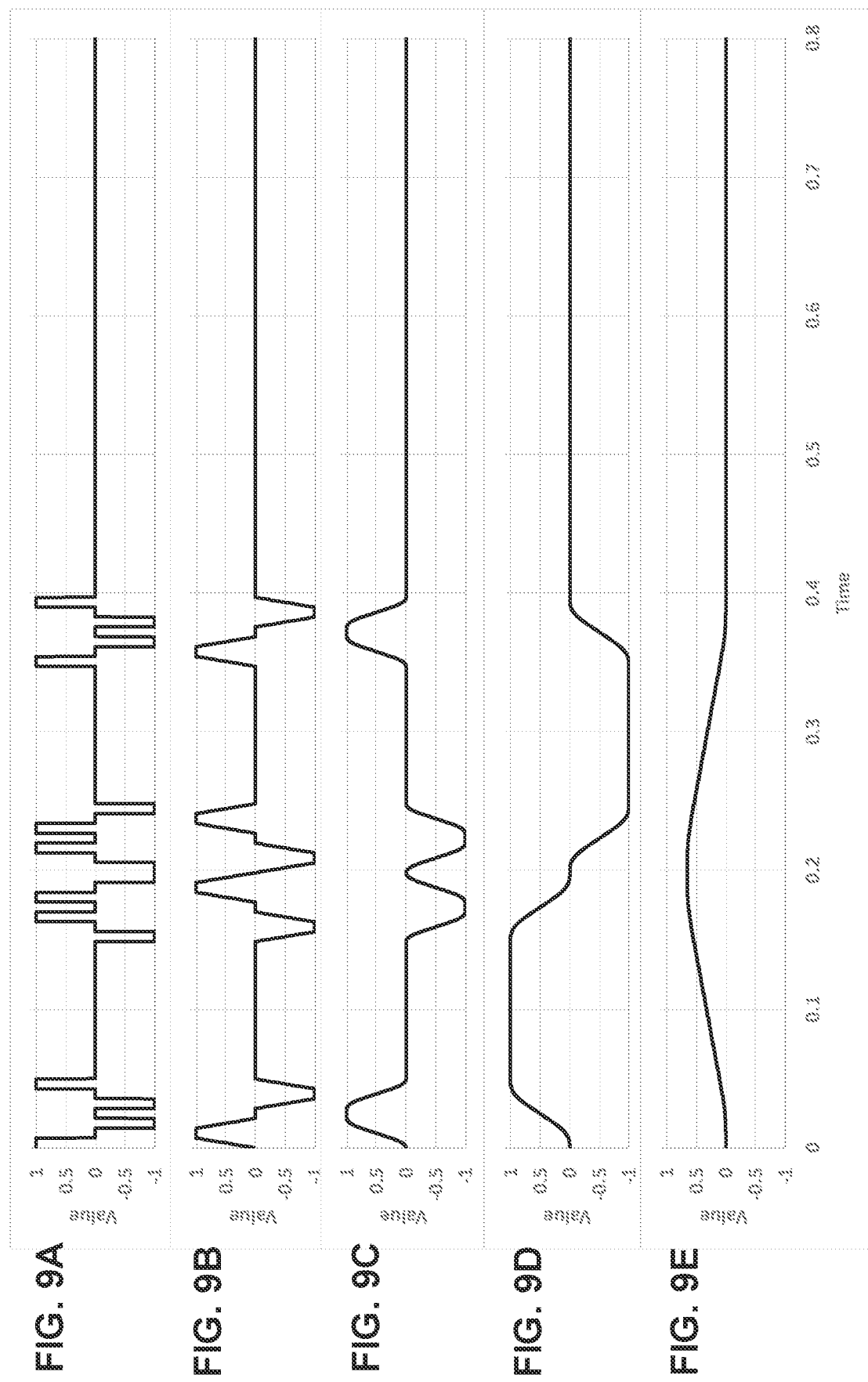

PULSED ELECTRIC MACHINE CONTROL

CROSS-REFERENCE TO RELATED APPLICATIONS

This application is a Continuation of U.S. application Ser. No. 16/866,917, filed on May 5, 2020 which is incorporated by reference herein in its entirety.

BACKGROUND OF THE INVENTION

The present application relates generally to electric machine control. More specifically, control schemes and controller designs are described that smoothly pulse the operation of an electric machine during selected operating conditions to facilitate operating the electric machine in a more energy efficient manner.

The term "electric machine" as used herein is intended to be broadly construed to mean both electric motors and generators. Electric motors and generators are structurally very similar. Both include a stator having a number of poles and a rotor. When an electric machine is operating as a motor, it converts electrical energy into mechanical energy. When operating as a generator, the electric machine converts mechanical energy into electrical energy.

Electric motors and generators are used in a very wide variety of applications and under a wide variety of operating conditions. In general, many modern electric machines have relatively high energy conversion efficiencies. The energy conversion efficiency of most electric machines, however, can vary considerably based on their operational load. With many applications, an electric machine is required to operate under a wide variety of different operating load conditions. As a result, many electric machines operate at or near the highest levels of efficiency at certain times, while at other times, they operate at lower efficiency levels.

Battery powered electric vehicles provide a good example of an electric machine operating at a wide range of efficiency levels. During a typical drive cycle, an electrical vehicle will accelerate, cruise, de-accelerate, brake, corner, etc. Within certain rotor speed and/or torque ranges, the electric machine operates at or near its most efficient operating point, i.e. its "sweet spot". Outside these ranges, the operation of an electric machine is less efficient. As driving conditions change, the electric machine transitions between high and low operating efficiency levels as the rotor speed and/or torque demand change. If the electric machine could be made to operate a greater proportion of a drive cycle in high efficiency operating regions, the range of the vehicle for a given battery charge level would be increased. Since the limited range of battery powered electric vehicles is a major commercial impediment to their use, extending the operating range of the vehicle is highly advantageous.

Although the energy conversion efficiency of conventional electric machines is generally good, there are continuing efforts to further improve energy conversion efficiencies over broader ranges of operating conditions.

SUMMARY OF THE INVENTION

A variety of methods, controllers and electric machine systems are described that facilitate pulsed control of electric machines (e.g. electric motors and generators) to improve the energy conversion efficiency of the electric machine when conditions warrant. More specifically, under selected operating conditions, an electric machine is intermittently driven (pulsed) to deliver a desired average output. The pulsed operation of the electric machine causes the output of the electric machine to alternate between a first output level that is higher than the machine's desired average output and a second output level that is lower than the desired average output. The first and second output levels are selected such that at least one of the electric machine and a system that includes the electric machine has a higher energy conversion efficiency during the pulsed operation than the electric machine would have when operated at a third output level that would be required to drive the electric machine in a continuous manner to deliver the desired average output. In many embodiments, the second output level is zero torque (or substantially zero torque).

At least some of the transitions between pulsing output levels are controlled to provide a cubic or higher order transition profile. In various implementations, cubic, quintic or even higher order transition profiles are use. The use of such transition profiles can improve NVH characteristics of the electric machine and/or provide other benefits.

In various embodiments, different transition profiles may be used in a particular electric machine under different operating conditions. For example, different transition profiles may optionally be used at different operating speeds, at different pulsing frequencies and/or at different pulsing output levels. They may also vary based on whether the transition is from a zero output level to a target pulsing output level, or vice versa; whether the electric machine is operating as a motor or a generator; other design considerations and/or combinations of any of the foregoing.

In some embodiments, an electric machine controller includes a pulsing decision module and a pulse controller. The pulsing decision module determines when pulsed operation of the electric machine is desirable and when continuous operation of the electric machine is desirable to deliver a desired average output. The pulse controller directs pulsed operation of the electric machine when the pulsing decision module determines that pulsed operation is desirable. In some embodiments, the pulse controller includes a transition profile generator that controls transitions using a cubic or higher order transition profile. In some embodiments an S-shaped transition profile is used.

BRIEF DESCRIPTION OF THE DRAWINGS

The invention and the advantages thereof, may best be understood by reference to the following description taken in conjunction with the accompanying drawings in which:

FIGS. 6A-6C are a series of related graphs that show angular jerk, angular acceleration and torque profiles for an exemplary $3^{rd}$ order transition torque profile.

FIGS. 8A-8E are a series of related graphs showing quintic, quartic, cubic, angular acceleration and torque profiles for an exemplary $5^{th}$ order (quintic) transition torque profile in a circumstance where the period of a desired off portion of a pulse cycle is shorter than the torque transition time.

FIGS. 9A-9E are a series of related graphs showing quintic, quartic, cubic, angular acceleration and torque profiles for an exemplary $5^{th}$ order (quintic) transition torque profile in a circumstance where the period of a desired on portion of a pulse cycle is shorter than the torque transition time.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

The present application relates to pulsed control of a wide variety of electric machines (e.g., electric motors and generators) that would otherwise be operated in a continuous manner Pulsed electric machine control is described in U.S. patent application Ser. Nos. 16/353,159 and 16/353,166 filed on Mar. 14, 2019 and Ser. No. 16/818,570 filed Mar. 13, 2020. Each of the forgoing applications is incorporated herein by reference in its entirety. As described in the incorporated applications, pulsed control of an electric machine offers the advantage of improving the operational energy conversion efficiency of the machine.

When pulsing is employed, there are frequent changes in the electric machine's commanded output. A potential drawback of pulsed control is that the frequent output transitions can increase the operational noise, vibration and harshness (NVH) generated by the electric machine. The NVH issues associated with pulsing tend to be worse in electric machines having higher electrical time constants since the machine's electrical time constants may impose practical limitations on the frequency at which pulsing can occur. When pulsing frequencies are in frequency ranges that are generally perceptible to humans, the NVH concerns tend to be greater. Therefore, it is desirable to manage pulsing transitions in an effective and efficient manner.

The present application proposes the use of cubic or higher order pulse transition torque profiles in some electric machine pulsing application. Such control can help mitigate NVH issues while managing transitions in an efficient manner. In some embodiments, quintic pulse transition profiles are used.

Figure 1:
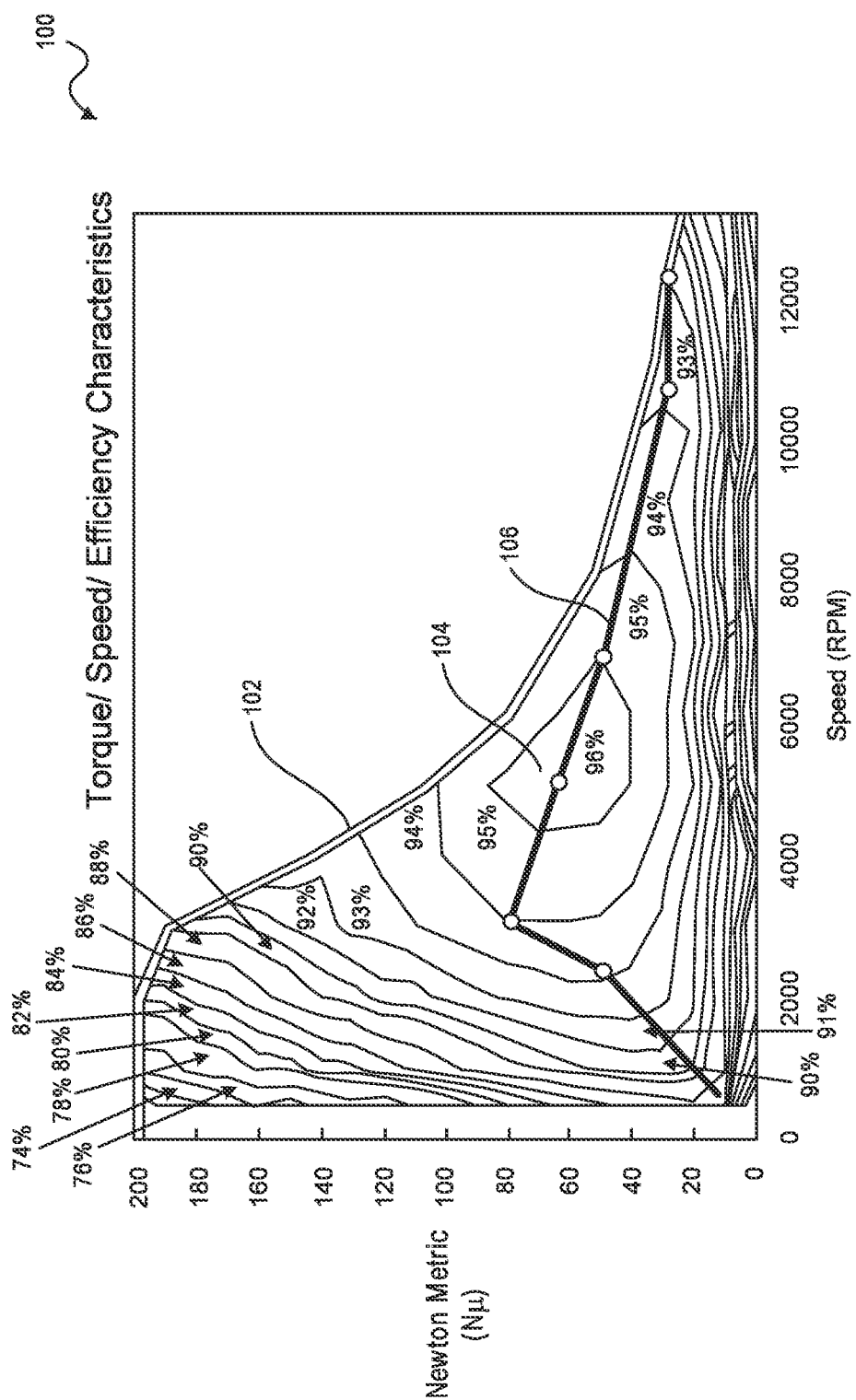
FIG. 1 is a representative Torque/Speed/Efficiency graph illustrating the energy conversion efficiency of a representative electric machine while operating as an electric motor under different operating conditions.

Referring to FIG. 1, an exemplary electric machine efficiency map 100 while operating as a motor under different load and speed conditions is illustrated. The map 10 plots torque (N*m) along the vertical axis as a function of electric machine speed (RPM) along the horizontal axis. The maximum steady-state output power is given by curve 102.

The area under the peak-torque/speed curve 102 is mapped into a plurality of regions, each labeled by an operational efficiency percentage. For the particular electric machine shown, the following characteristics are evident:

The most efficient or "sweet-spot" region of its operating range is the operating region labeled 104, which is generally in the range of 4,500-6,000 RPM with a torque output in the range of about 40-70 N*m. In region 104, the energy conversion efficiency is on the order of 96%, making it the "sweet spot", where the motor is operating in its most efficient operating range.

As the motor speed increases beyond approximately 6,000+ RPM, the efficiency tends to decrease, regardless of the output torque.

As the output torque increases beyond 70 N*m or falls below 40 N*m, the efficiency percentage tends to decrease from its peak, in some situations rather significantly. For example, when the motor is operating at approximately 2,000 RPM and an output torque of 100 N*m, the efficiency is approximately 86%. When torque output falls below about 30 N*m, regardless of the motor speed, the efficiency drops, approaching zero at zero load.

At any particular electric machine speed, there will be a corresponding most efficient output torque, which is diagrammatically illustrated by a maximum efficiency curve 106.

The map 100 is for an internal permanent magnet synchronous electric machine. Specifically, it was derived from a traction motor used in a 2010 Toyota Prius. It should be understood that this map 100 is merely illustrative and should not be construed as limiting in any regard. A similar map can be generated for just about any electric machine, regardless of whether it is used in a vehicle or in some other application.

As can be seen from the map 100, when motoring, the electric machine is generally most efficient when operating within the speed and torque ranges of the sweet spot 104. If the operating conditions can be controlled so that the motor operates a greater proportion of the time at or near its sweet spot 104, the overall energy conversion efficiency of the motor can be significantly improved.

From a practical point of view, however, many driving situations dictate that the motor operate outside of the speed and torque ranges of the sweet spot 104. In electric vehicles it is common to have no transmission or gear box and as such have a fixed ratio of the electric motor rotation rate to the wheel rotation rate. In this case, the motor speed may vary between zero, when the vehicle is stopped, to a relatively high RPM when cruising at highway speeds. The torque requirements may also vary widely based on factors such as whether the vehicle is accelerating or decelerating, going uphill, going downhill, traveling on a level surface, braking, etc.

As also seen in FIG. 1, at any particular speed, there will be a corresponding most efficient output torque which is diagrammatically illustrated by maximum efficiency curve 106. From a conceptual standpoint, when the desired motor torque is below the most efficient output torque for the current motor speed, the overall efficiency of the motor can be improved by pulsing the motor, so as to operate the motor a proportion of time at or near its peak efficiency for the given speed and the remainder of the time at a low or zero torque output level. The average torque thus generated is controlled by controlling the duty cycle of peak efficiency torque applied to the electric machine.

It should be appreciated that the electric machine would have a similar efficiency map that characterizes its efficiency when acting as a generator.

Figure 2:
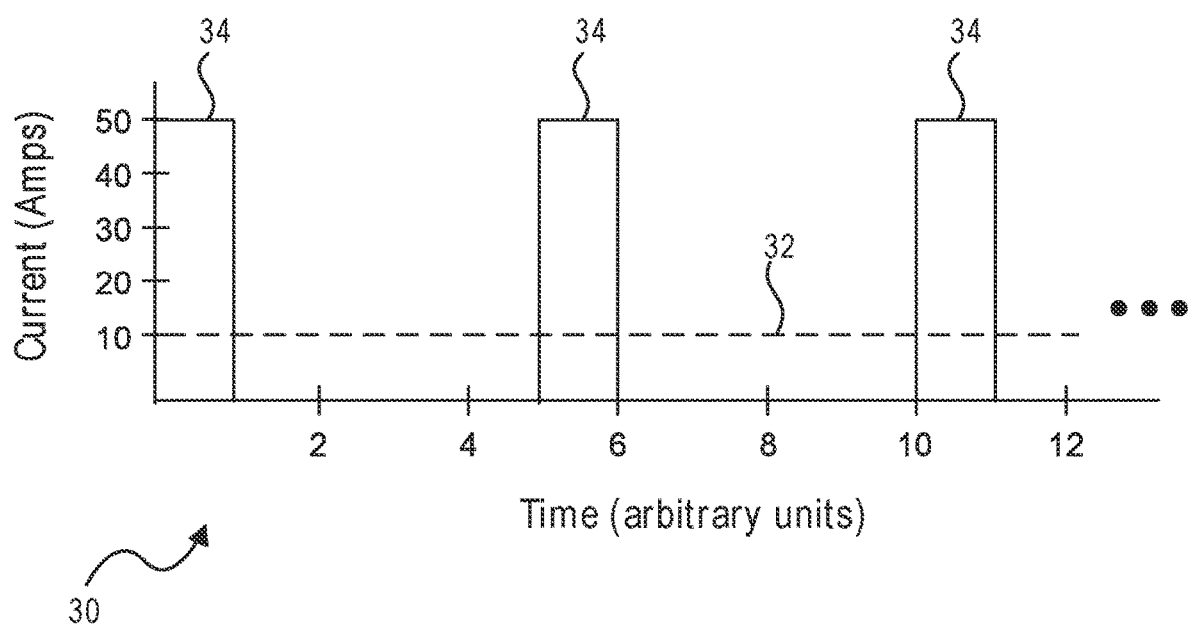
FIG. 2 is a graph illustrating a pulsed current signal applied to an electric machine in response to a torque demand while operating as a motor.

FIG. 2 is a graph 20 that diagrammatically illustrates an example of pulsed motor operation. In this particular example, the desired motor torque is 10 Nm, but the most efficient torque output for the current operating motor speed is 50 Nm. During conventional operation, the motor would continuously generate 10 Nm, provided the desired torque remained at this value. Conceptually, the motor can be driven to deliver a net average torque of 10 Nm by causing the motor to deliver 50 Nm of torque for 20% of the time and then delivering no (zero) torque the remaining 80% of the time. The net output of the motor therefore meets the operational demand of 10 Nm. Since the motor operates more efficiently when it is delivering 50 Nm than when it delivers 10 Nm, the motor's overall efficiency can conceptually be improved by pulsing the motor's operation in the described manner.

In FIG. 2, the graph 2 plots on the vertical axis a total applied current to an electric machine 12 (acting as an electric motor) versus time on the horizontal axis. For illustrative purposes, it will be assumed that each ampere of applied current will produce 1 Nm of output torque. In this particular example, a desired motor output torque is 10 Nm, which will require 10 amps of current as represented by the dashed line 22. Also in this example, the most efficient torque output for the motor is 50 Nm corresponding to 50 amps of applied current.

In the example illustrated in FIG. 2 the motor produces a motor output of 50 Nm (labeled 24) for a period of 1 time unit out of every 5 time units and then the motor is turned off (or controlled to produce zero torque) during the intervening 4 time units which corresponds to a 20% duty cycle. Of course, the duty cycle is not limited to 20%. As long as the desired motor output, does not exceed 50 Nm, the desired motor output can be met by a wide range of different duty cycles. For instance, if the desired motor output changes to 20 Nm, the duty cycle of the motor operating at 50 Nm can be increased to 40%; if the desired motor output changes to 40 Nm, the duty cycle can be increase to 80%; if the desired motor output changes to 5 Nm, the duty cycle can be reduced to 10% and so on. Generally, pulsed motor control can potentially be used advantageously any time that the desired motor torque falls below its maximum efficiency curve (i.e., the curve 106 of FIG. 1).

On the other hand, when the desired motor torque is at or above the maximum efficiency curve, the motor may be operated in a conventional (continuous or non-pulsed) manner to deliver the desired torque. Pulsed operation thus offers an opportunity for efficiency gains when the motor is required to deliver an average torque below the peak efficiency torque for a given motor speed.

It should be noted that current and torque values and time scale provided herein are merely illustrative and are not intended to be limiting in any manner. In actual electric machine pulsing applications, the pulse duration used may widely vary based on the design needs of any particular system. In generally, however, the scale of the periods for each pulse cycle is expected to be on the order of 10 μsec to 10 seconds (i.e. pulsing at a frequency in the range of 0.5 to 100,000 Hz), as for example between 20 milliseconds to 2 second (0.5 to 5000 Hz). Furthermore, there are a wide variety of different electric machines and each machine has its own unique efficiency characteristics.

In FIG. 2, transitions in the commanded drive current and the resulting torque are shown as step functions which is useful for explaining the benefits of pulsing. However, it should be appreciated that in practice, there will be time lags between the application of a voltage to a electric machine's windings and the buildup of the magnetic flux linkages required to produce the desired torque. Thus, in practice, the profile of the torque pulses produced are unlikely to be rectangular as depicted in FIG. 2.

Figure 3:
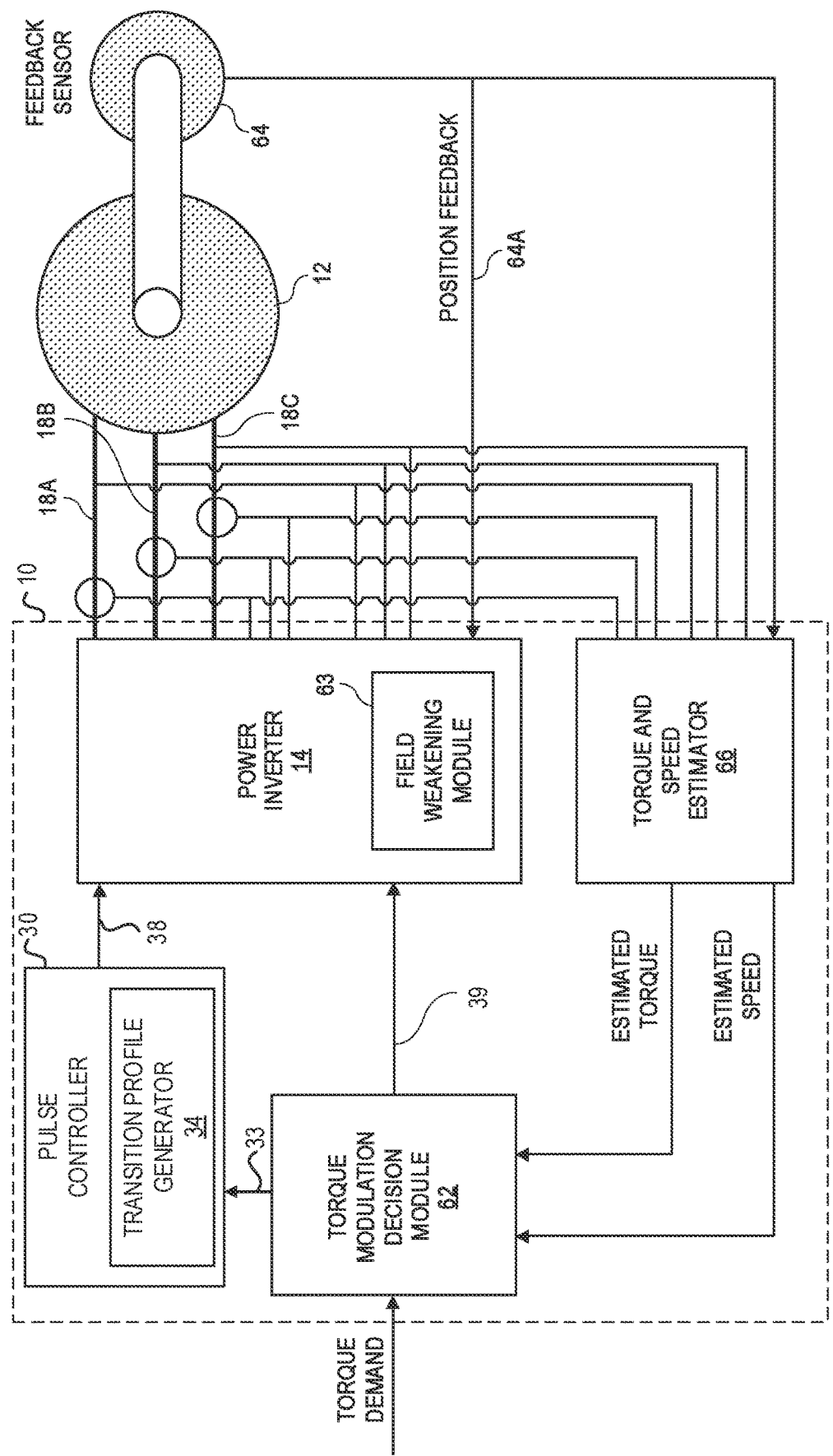
FIG. 3 is a block diagram of an electric machine controller in accordance with a non-exclusive embodiment of the present invention.

FIG. 3 is a block diagram illustrating a system having an electric machine controller 10 that enables pulsed operation of an electric machine 12. The electric machine 12 may be any type of electric machine, including induction motors/machines, permanent magnet assisted synchronous reluctance machines, IPM machines and others. The illustrated electric machine 12 is a three phase electric machine although it should be appreciated that the electric machine may be designed to utilize any desired number of phases including just a single phase.

The electric machine controller 10 includes a power inverter 14, a pulse controller 30 and torque control decision module 32. The power inverter 14 may be operated as a power inverter or power rectifier depending on the direction of energy flow through the system.

When the electric machine 12 is operated as a motor, the power inverter 14 is responsible for generating three-phased AC power (denoted as 18A, 18B and 18C for phases A, B and C respectively) from the DC power supply 16. The three-phased input power is applied to the windings of the stator of the electric machine 12 for generating a Rotating Magnetic Force (RMF). In an induction motor, this rotation field induces current to flow in the rotor winding which in turn induces a rotor magnetic field. The interaction of the rotor and stator magnetic fields generates an electromagnetic force (EMF) causing rotation of the rotor, which in turn rotates a motor shaft. The rotating shaft provides the output torque of the motor. For most common permanent magnetic motors, the rotor field is that of the permanent magnet.

The three phases, 18A-18C are each depicted by lines with arrows on both ends indicating that current can flow in either direction. When used as a motor, current flows from the power supply 16, through the power inverter 14, to the electric machine 12. When used as a generator, the current flows from the electric machine 12, through the power inverter 14, to the power supply 16. When operating as a generator, the power inverter 14 essentially operates as a power rectifier and the AC power coming from the electric machine 12 is converted to DC power being stored in the DC power supply, such as a battery or capacitor.

The pulse controller 30 is responsible for selectively pulsing the three-phased input current 18A-18C to the electric machine 12. During conventional (i.e., continuous) operation, the three-phased input current provided to the electric machine 12 are continuous sinusoidal current signals, each 120° degrees out of phase with respect to one another. During pulsed operation, the phased three sinusoidal current signals 18A-18C are selectively pulsed using any of the approaches described herein.

Figure 4A:
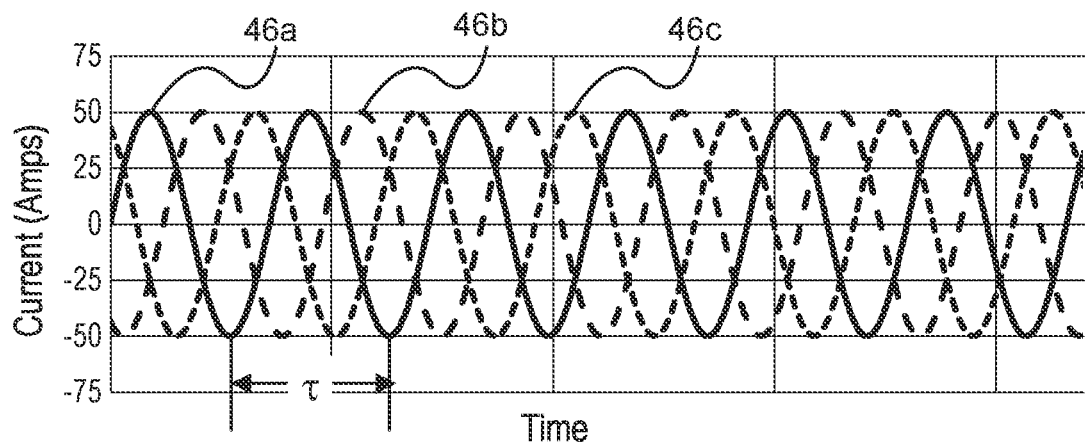
FIG. 4A is a diagrammatic representation of a continuous three-phase AC waveform provided to an electric machine.
Figure 4B:
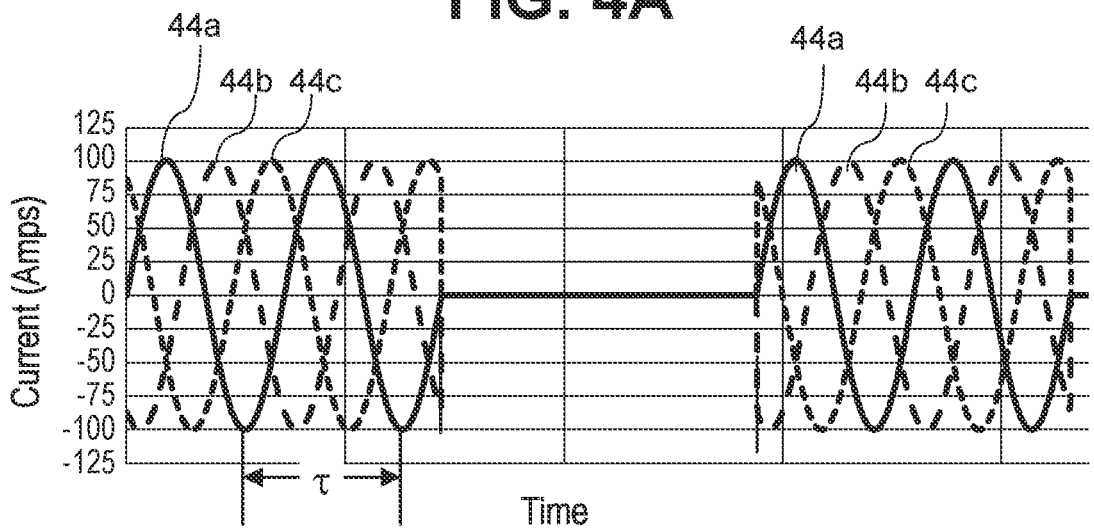
FIGS. 4B and 4C are different examples of pulsed three-phase AC waveform having a similar duty cycle that provide the same torque as the continuous waveform of FIG. 4A.
Figure 4C:
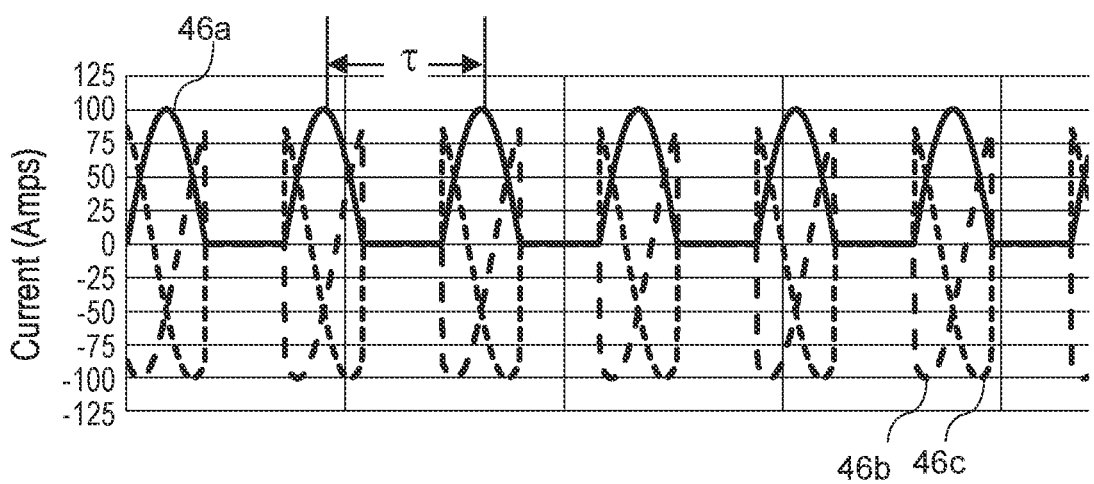

Referring to FIG. 4A-4C, plots are provided for illustrating the difference between continuous and pulsed three-phased current provided to/by the electric machine 12. In each, current is plotted on the vertical axis and time is plotted along the horizontal axis.

FIG. 4A illustrates conventional sinusoidal three-phased current 42a, 42b, and 42c delivered to/produced by the electric machine 12 during excitation. Phase B, denoted by curve 42b lags phase A, denoted by 42a by 120 degrees. Phase C, denoted by curve 42c, lags phase B by 120 degrees. The sine wave period is T. The three-phased current 42a, 42b, and 42c is continuous (not pulsed) and has a designated maximum amplitude of approximately 50 amps. It should be appreciated that 50 amps is only a representative maximum current and the maximum current may have any value.

FIG. 4B and FIG. 4C illustrate two examples of different pulsed three-phased sinusoidal current waveforms 44a, 44b, and 44c and 46a, 46b, and 46c respectively. Note, each set of waveforms have a fifty percent (50%) duty cycle and peak amplitude of approximately 100 amps.

In FIG. 4A the period of the sinusoidal waveforms 44a, 44b, and 44c is τ, however, the sine waveforms are each modulated on and off. The difference between pulsed currents 44a-c and 46a-c of FIG. 4C is the duration of their respective current pulses and the interleaved "off" periods. In FIG. 4B, the current pulses 44a-c is interleaved with "off" periods of equal length. The length of each on and off period is 2τ. In FIG. 4C, the current pulses 46a-c and the interleaved "off" periods again have equal duration. In this case the duration is τ/2. In both examples, the duty cycle is 50%. However, the duration of the "on" and "off" time durations periods is different, i.e. the frequency of the pulsed modulation is different. The frequency of the pulsed modulation may vary based on the type of electrical machine used, noise and vibration considerations, current operating rotor speed, and other factors.

When operating as a motor, the excitation current in FIG. 4B and FIG. 4C delivers the same average torque as the continuously applied three-phased current of FIG. 4A (assuming torque is proportional to current, which is often the case with surface permanent magnet type electric machines).

FIG. 4B and FIG. 4C illustrate applications in which the "on" drive pulses are evenly spaced while the electric machine is operated at a steady state desired output level. Such an approach works well in many circumstances but is not a requirement. The duty cycle need not be 50% but can be adjusted to match the desired average torque. In FIG. 4B and FIG. 4C the phase of the pulses is synchronized with the applied AC power; however, the phase of the pulses need not be synchronized with the phase of the applied AC power in some embodiments. Thus, the relative sizes and/or timing of the electric machine drive pulses can be varied as long as they average out to the desired average torque.

Returning to FIG. 3, during operation of the electric machine, the torque modulation decision module 32 receives a torque demand. In response, the torque modulation decision module 32 makes a determination of whether the requested torque demand is more or less than a designated "pulsing" threshold associated with the current machine speed. In most embodiments, the pulsing threshold will vary as a function of the speed of the electric machine 12. In some embodiments, the pulsing threshold for a given speed may be at or near the peak efficiency torque of the electric machine 12 for that speed. However, that is not a requirement. It should be appreciated that there are a number of factors that may go into the determination of the appropriate pulsing threshold for any particular motor/generator speed. The net operational efficiency of the electric machine, or a larger system that includes the electric machine is one important factor in the determination of the pulsing threshold as will be discussed in more detail below. However, other factors (e.g., NVH mitigation concerns) may be considered as well.

When the torque demand is higher than the pulsing threshold, the torque modulation decision module 32 directs the electric machine 12 to operate in a continuous mode. In this case, torque demand is passed to the inverter 14 as inverter control signal 39 in a traditional manner and the inverter 14 directs operation of the electric machine in a continuous manner to deliver the desired torque.

When the torque demand is less than the pulsing threshold, the torque modulation decision module 32 determines the desired pulsed control operational state. The desired pulsed control operational state is passed via 33 to pulse controller 30 which then directs operation of the inverter 14 via inverter control signal 38. In this context, the pulsing operational state may include an indication of whether pulsed control is enabled, and if so, (a) the desired target output level when during the torque on periods (sometimes referred to as the target pulse torque); (b) the desired pulsing duty cycle; and (c) whether the inverter should be remain active or be deactivated during the no torque periods. In practice, the characteristics of the electric machine, the combination of the electric machine and its control system, and/or a larger system that includes the electric machine/ machine controller may be characterized through the creation of operational maps such as the efficiency maps described above. Base on such maps, the most efficient operational state for any and all operating conditions (e.g., all possible machine speed and output level combinations) can be determined. In some embodiments, this information may be stored in a data structure such as a lookup table that may be utilized by toque modulation decision module 32 to determine the appropriate operating state for any commanded output (e.g., torque demand) based on the current machine speed, and any other relevant control parameters. In other embodiments, the torque modulation decision module may use algorithmic or other suitable approaches to make such decisions.

The pulse controller 30 is responsible for controlling/ directing the timing of the pulsing of electric machine 12 when pulsed operation is called for. In the illustrated embodiment, the pulse controller 30 includes a transition profile generator 34, the purpose of which will be described next.

Transition Control

Figure 5:
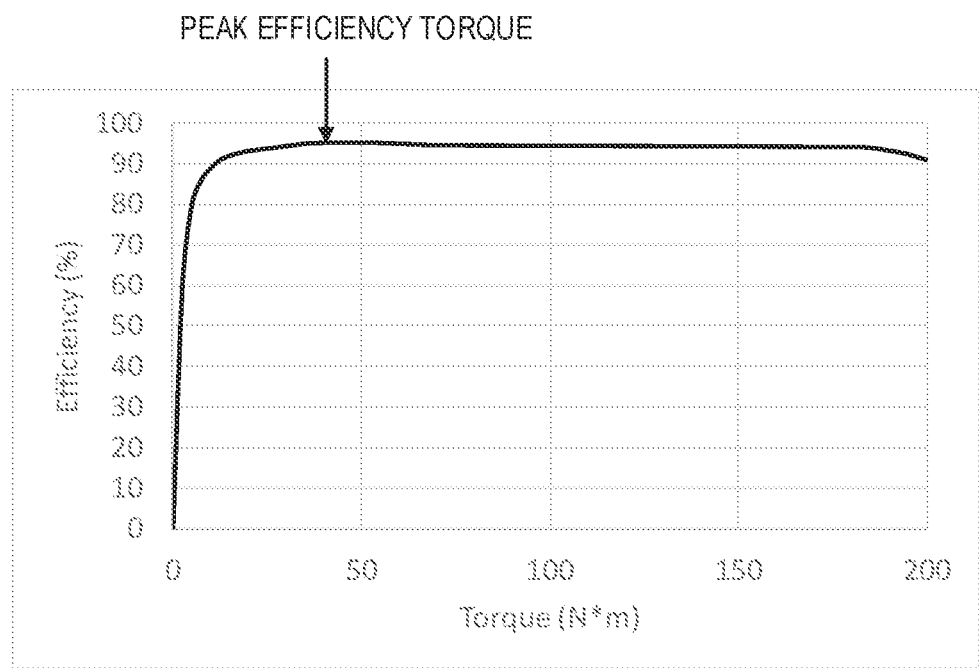
FIG. 5 is a graph illustrating a representative electric machine system efficiency as a function of machine torque at a fixed machine speed.

When implementing pulsed electric machine control there are frequent transition in commanded torque between a low value (normally zero) and a higher value having a higher energy conversion efficiency and vice versa. For best efficiency, the transition is preferably very quick. The benefit of this can be appreciated by reference to FIG. 5. FIG. 5 is a graph that diagrammatically plots the energy conversion efficiency (vertical axis) of an electric machine operating as a motor at a fixed speed for various torque demands (horizontal axis). It should be apparent that rapid transitions through the low torque/efficiency regions help maximize the overall energy conversion efficiency.

In the example of pulsed control illustrated in FIG. 2, transitions between the low (e.g. zero) output level and the higher drive pulse level and vice versa are shown as step functions. However in practice, for many electric machines, such abrupt transitions are not practically achievable, adversely affect the machine's energy conversion efficiency and/or can generate undesirable NVH.

More specifically, when a voltage is first applied to a motor's windings, the buildup of the magnetic flux linkages, magnetizing ($\lambda_{dr}^e$) and motive ($\lambda_{qs}^e$), lag the applied voltage as in all inductive circuits. If the object of the control is to reach a target pulsing torque as rapidly as possible then the controller could theoretically compensate for the lagging magnetizing flux linkages by increasing $i_{qs}^e$ to achieve the demanded torque. This has the effect of increasing the applied current and hence increasing the motor and inverter losses which is counter to the object of pulsed control, minimizing the losses. Therefore, it is desirable to control the amplitude and phase of the applied current during the transitions to ensure that the transitions are made with minimal losses. Stated another way, during transitions, the flux linkages are preferably controlled such that they result in the most efficient overall solution for the torque equation.

Quick and efficient transitions are relatively easily achieved in motors/machines that have a relatively small time constant associated with building up the magnetic flux linkages required to support the target torque. However, as the time constants increase, the speed at which transitions can practically be achieved decreases—which limits the practical pulsing frequency. For example, the time constants associated with some induction motors is high enough such that pulsing at relatively low frequencies on the order of 0.5 to 20 Hz may be desirable. Humans are quite sensitive to vibrations in such frequency ranges which emphasizes the need to consider NVH issues in pulsed motor control.

To address the competing demands of quick transitions times, energy efficient transitions and mitigating NVH concerns, the present disclosure proposes the use of transition torque profiles having specific characteristics. In various preferred embodiments, the commanded torque is smoothly but slowly transitioned from zero, then rapidly increased through most of the lower efficiency area and finally slowly transitioned to the desired pulsing torque (e.g., a value at or near the peak efficiency torque for the current machine speed). In some embodiments, this is accomplished through the use of an S-shaped transition torque application profile. This approach has several advantages. These include:

1. A smooth initial transition from zero torque is used to build up the rotor flux linkages $\lambda_{dr}^e$ while controlling the applied motor phase current to a low level to minimize the losses during this period.
2. The rate of change through most of the lower efficiency area is optimized for minimal losses independently of the need to build up the rotor flux.
3. Smooth transition to the target operational pulsing torque take place at an efficiency close to that of the peak efficiency.

The same (reversed) approach is used for transitions from the operational torque to the zero torque state which facilitates an orderly extraction of energy stored in the motors magnetic field.

One way to provide a smooth S-shaped curve is through the use of third order (cubic) transition torque request profile generation. Cubic control is sometime referred to as "jerk" control in various control fields because in physics jerk is the third time derivative of position. Similarly angular jerk is the third time derivative of angular momentum. In other embodiments higher order functions such as quintic ($5^{th}$ order) or higher are used to generate the transition torque profiles. The specific torque profiles commanded by the pulse controller 30 during transitions are dictated by transition profile generator 34. The specific transition torque profiles used in any specific operating conditions may be determined in any desired way. In some embodiments, the profiles are generated in real time algorithmically by the transition profile generator 34. In other embodiments, an appropriate lookup table or other suitable data structure may be provided so that the transition profile generator can simply look up the appropriate transition torque profile for the current operational state.

FIGS. 6A-6C diagrammatically illustrate an example of a jerk base transition torque profile that can be applied by torque profile generator 34. More specifically, FIG. 6A is a graph showing the jerk profile (aka, a cubic or $3^{rd}$ order profile) associated with the example transition torque profile. FIG. 6B is a graph showing the resultant angular acceleration ($2^{nd}$ order profile)—which is the integral with respect to time of the angular jerk illustrated in FIG. 6A). FIG. 6C is a graph showing the resultant transition torque profile ($1^{st}$ order profile)—which is the integral with respect to time of the angular acceleration shown in FIG. 6B). It should be apparent that jerk profile illustrated in FIG. 6A is the second derivative with respect to time of the torque illustrated in FIG. 6C (and third derivative with respect to time of angular momentum, not shown).

In the illustrated embodiment, when torque is initially applied, the angular jerk is set to a first value 611 and held constant for an initial period 610. FIG. 6A. During this time the angular acceleration steadily increases as seen in FIG. 6B and labeled 613. At the same time, the torque slowly increases (labeled 615). After initial period 610, the jerk is set to zero 621 and held constant for a second period labeled 620. In that period 620, the angular acceleration remains constant (623 in FIG. 6B) and the torque increases relatively quickly (625 in FIG. 6C). When the torque approaches the target pulse torque, the jerk is set to a negative second value 631 for a third period 630. During this period, the angular acceleration decreases (633 in FIG. 6B). When the angular acceleration reaches zero, the target torque 636 is achieved and the jerk is set to zero for fourth period 640 that extends for the duration of the pulse.

The transition from the target torque to the zero "off" period of pulsed control can be accomplished in a reciprocal manner. When the transition begins, at point 649, the jerk is set to a negative value 651 and held constant for a fifth period 650. During that period the angular deceleration steadily increases 653 and the torque begins to slowly decrease 655. After the transitional fifth period 650, the jerk is set to zero 661 and held constant for a sixth period labeled 660. In that period 660, the angular deceleration remains constant (663 in FIG. 6B) and the torque decreases relatively quickly (665 in FIG. 6C). When the torque approaches zero, the jerk is set to a positive value 671 for a third period 670. During this period, the angular deceleration decreases (673 in FIG. 6B). If controlled properly, the angular deceleration and the torque will reach zero (point 682) at the same time, at which point the jerk is set to zero thereby initiating the "off" period of pulsed control 680. Depending on the type of control desired for the off periods of pulsed control, the inverter can be turned off at this stage, or it can maintain operation directing zero torque. The commanded torque remains zero, until the next pulse is directed at which point the process just described is repeated for the next pulse.

In general, the goal is to ensure that the total torque delivered in a pulse (the area 600 under the torque pulse curve 601 in FIG. 6C) substantially equals the pulse's desired total torque.

It should be apparent that the example of FIG. 6A-6C is illustrative in nature. The relative magnitudes of changes in the affirmative jerk settings may be varied widely to meet the needs and design goals of any particular situation. In the illustrated embodiment, the magnitude of the changes in the jerk settings is shown as the same for all jerk transitions. This includes transitioning away from an existing torque level, approaching a new target torque level, and intermediate changes. Similarly, the jerk setting for both transitioning from zero to the target torque and transitioning from the target torque to zero are shown as the same. None of these are requirements. Rather, the relative magnitude (and corresponding durations) of the various transitions may be varied to meet the needs of any particular pulsed control design implementation. In practice, the specific values for any design will be based on a number of considerations including the electric machine's time constants, NVH considerations, performance requirements, etc.

Although the described jerk based torque profile generation can significantly mitigate NVH in many applications, even further improvements can be attained by using higher order control in some circumstances. More specifically, a feature of the illustrated jerk based control is that there will be abrupt changes in the resultant angular acceleration (i.e., corners in the context of calculus) as seen in FIG. 6B. These abrupt changes/corners occur at the transitions between different jerk levels, labeled points 607, 617, 627, 637, 647, 657, 667 and 677 in FIG. 6B. In practice, such abrupt changes in acceleration can increase the likelihood of perceptible NVH being generated. One way to eliminate abrupt changes in angular acceleration (and to thereby further mitigate NVH) is to utilize even higher order profile generation control. In practice quintic ($5^{th}$ order) or higher profile generation can be used to entirely eliminate abrupt changes in the angular acceleration.

Figure 7A:
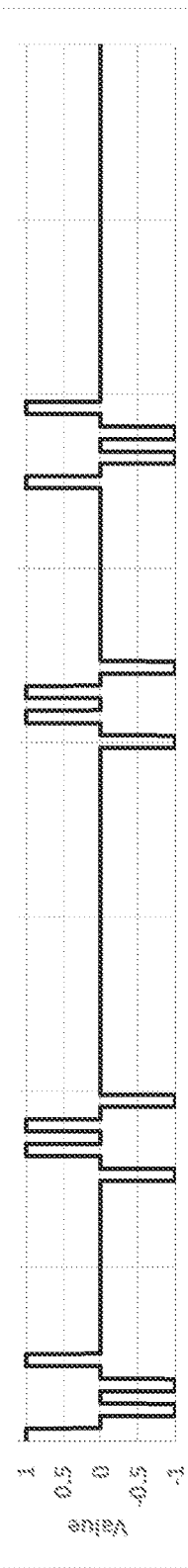
FIGS. 7A-7E are a series of related graphs showing quintic, quartic, cubic (angular jerk), angular acceleration and torque profiles for an exemplary $5^{th}$ order (quintic) transition torque profile.
Figure 7B:
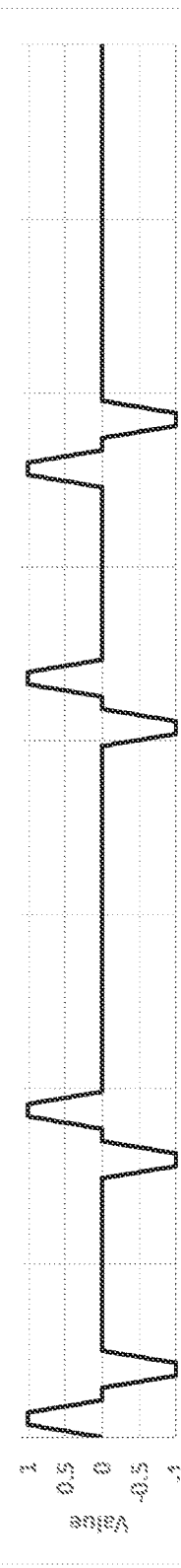
Figure 7C:
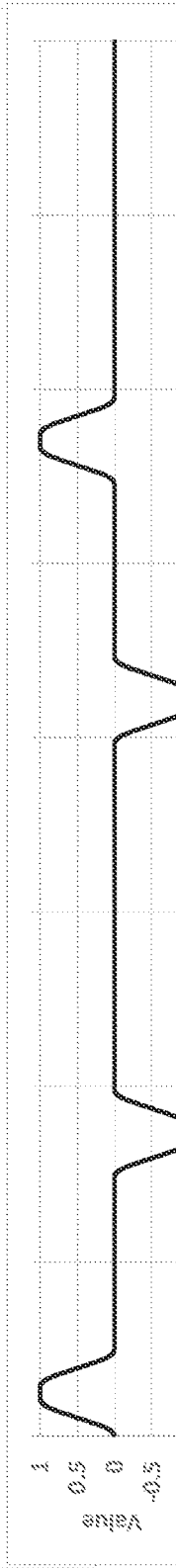
Figure 7D:
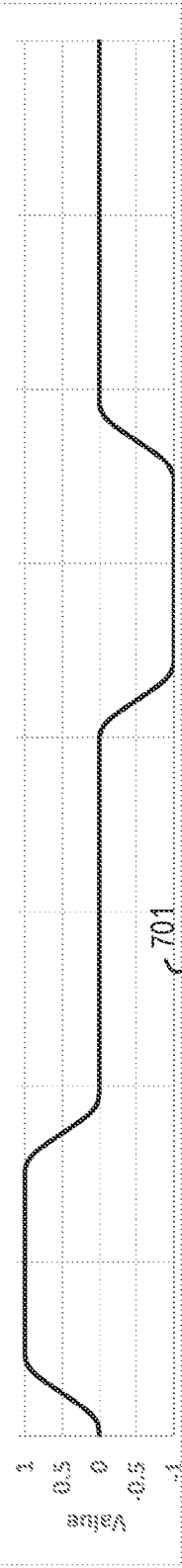
Figure 7E:
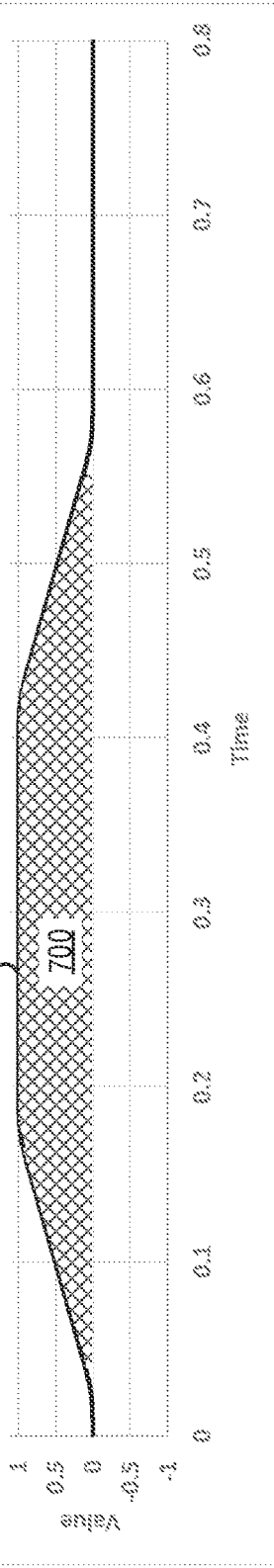

Quintic profile generation is diagrammatically illustrated in FIGS. 7A-7E. More specifically, FIG. 7A is a graph showing a representative quintic ($5^{th}$ order) profile created by a quintic torque profile generator. FIG. 7B is a graph showing the corresponding quartic ($4^{th}$ order) response to the illustrated quintic profile (the time based integral of the quintic profile illustrated in FIG. 7A). FIG. 7C is a graph showing the resultant cubic or jerk ($3^{rd}$ order) profile (the time based integral of the quartic profile illustrated in FIG. 7B). FIG. 7D is a graph showing the resultant angular acceleration (the time based integral of the angular jerk illustrated in FIG. 7C). FIG. 7E is a graph showing the resultant torque profile (the time based integral of the angular acceleration shown in FIG. 7D). It should be apparent that quintic profile illustrated in FIG. 7A is the fourth derivative with respect to time of the torque illustrated in FIG. 7E (and fifth time derivative of angular momentum, not shown).

A noteworthy characteristic of quintic profile generation schemes is that by definition, there are no abrupt changes (corners) or discontinuities in the angular acceleration (FIG. 7C). The lack of abrupt changes tends to help further reduce NVH. It should be appreciated that higher order profile generation than quintic profile generation (e.g., $6^{th}$ order, $7^{th}$ order, etc.) shares the advantage of ensuring that no discontinuities or abrupt changes occur in the angular acceleration and thus may be used for similar purposes, although they tend to add additional complexity to the torque profile generator.

In the quintic torque profile generation example shown in FIGS. 7A-7E, the magnitude of the changes in the quintic settings are the same for all quintic transitions. Much like the jerk transition discussed above, this is not a requirement and the relative magnitude and timing of transitions may be widely varied to meet the needs and design goals of any particular implementation. In general, the goal is to ensure that the total torque delivered in a pulse (the area 700 under the torque pulse curve 701 in FIG. 7E) substantially equals the pulses desired total torque.

There are a number of other factors to be considered in determining when pulsing is advantageous and desirable and some of those may be influenced by the transition control scheme employed by the torque profile generator 34 (e.g., step changes in requested torque, cubic profile generation, quintic profile generation, etc.)

The nature of some of those factors can be appreciated through an understanding of the nature of higher order torque profile generation. For example, if the pulsing duty cycle becomes too high relative to transition time, pulsed control could lead to a circumstance where the commanded torque never actually gets reduced to zero. Such a circumstance is diagrammatically illustrated in FIGS. 8A-8E which shows the effects of quintic torque profile generation when the "off" portion of the pulsing duty cycle that is shorter than the torque transition time. As can be seen in FIG. 8E, the commanded torque never actually reaches zero. As can be seen in the efficiency map of FIG. 5, the energy conversion efficiency of many motors doesn't drop off too quickly from the peak efficiency torque at many motor speeds. Thus, in such circumstances continuous operation at a slightly lower torque level may be more energy efficient than pulsed operation at the peak efficiency. In such operating regions, continuous operation may be preferable to pulsed operation. Such determinations can be made as part of the characterization/mapping of the electric machine and the machine's control law can be designed to utilize whichever approach is deemed more energy efficient and/or otherwise more desirable for any given operating state of the electric machine.

Conversely, when the pulsing duty cycle becomes too low relative to the transition time, situations can occur in which the commanded torque never actually reaches the target pulsing torque. This situation is diagrammatically illustrated in FIGS. 9A-9E. In such circumstance, the motor's overall energy conversion efficiency is likely to be better than it would be if continuous operation were employed. However, there may be a variety of ways that the overall energy efficiency can be even further improved. For example, in some circumstances, the pulsing frequency can be reduced so that longer period torque pulses are generated. Additionally or alternatively, the target torque used by the controller can be increased to a value that is higher than the peak efficiency torque so that the torque levels actually commanded by the torque profile generator actually reach (or at least get closer to) the desired level. Again, the relative impacts of such control can be determined during characterization/mapping of the electric machine and the machine's control law can be designed to utilize whichever approach is deemed more energy efficient and/or otherwise more desirable for any given operating state of the electric machine.

In the embodiment illustrated in FIG. 3, the pulse controller is shown as a component that is separate from the torque modulation decision module 32 to facilitate explanation of its function. However, in various embodiments, the pulse controller may be implemented as part of a machine controller that includes the torque modulation decision module 32, as a separate component, as part of power controller/inverter 14 or in other appropriate forms. Some of the basic function and operation of representative pulse controllers 30 are describe in the incorporated U.S. patent application Ser. Nos. 16/353,159 and 16/353,166.

The frequency at which the power is pulsed may be determined by the torque modulation decision module 32 or the pulse controller 30. In some embodiments, the pulsing frequency can be fixed for all operation of the electric machine, while in others it may vary based on operational conditions such as machine speed, torque requirements, etc. For example, in some embodiments, the pulsing frequency can be determined through the use of a look-up table. In such embodiments, the appropriate pulsing frequency for current machine operating conditions can be looked up using appropriate indices such as machine's speed, torque requirement, etc. The pulsing frequency may be determined by the torque modulation decision module 32, the pulse controller or other suitable components of the machine controller 10. In other embodiments, the pulsing frequency is not necessarily fixed for any given operating conditions and may vary as dictated by the pulse controller 30. This type of variation is common when using sigma delta conversion in the determination of the pulses as in the incorporated patent application.

During pulsed operation of the electric machine 12, the inverter is activated during pulses and is ideally deactivated between pulses. Deactivating the inverter is conceptually desirable because it helps reduce inverter losses and inverter induced losses during the no torque periods. However, there are times when it will be desirable to have the inverter actively command zero torque during the no torque periods (or at least a portion of the no torque periods). There are several reasons for this. One of the easiest to appreciate relates to back BEMF. When the BEMF of a permanent magnet motor exceeds the supply voltage 16 used by the motor, a retarding torque is generated that can significantly degrade the motor's efficiency. Field weakening is typically used to mitigate or eliminate the retarding torque. BEMF generated by a motor is primarily a function of motor speed. Therefore BEMF remains an issue during the no torque periods of pulsed motor control. Since field weakening is applied by the inverter, deactivating the inverter during the no torque periods of pulsed control in operating states of a motor in which field weakening is desired would have the effect of allowing BEMF to retard the motor during those periods thereby reducing the motor's overall efficiency (sometimes quite significantly). To mitigate these effects, the inverter is preferably left on commanding a zero torque during the no torque periods of pulsed control in operating regions where the BEMF exceeds the supply voltage. Of course, there may be other circumstances where it is desirable to maintain the inverter on during the no torque periods of pulsed operation. In various embodiments, the pulse controller 30 or the torque modulation decision module 32 may direct the inverter 14 to turn off when desired.

Although only a few embodiments of the invention have been described in detail, it should be appreciated that the invention may be implemented in many other forms without departing from the spirit or scope of the invention. For example, although cubic and higher order function generation is described for generating the torque transition profiles, it should be appreciated that smooth S-shaped transition profiles that eliminate discontinuities in the angular acceleration or eliminate both discontinuities and corners in the angular acceleration may be generated in other ways as well.

Most of the discussion above focuses on controlling the torque during transitions and therefore refer to controlling the transition torque profile. As will be appreciated by those familiar with motor control, the same or similar results can be accomplished by controlling the current in the same manner (i.e., using cubic or higher order transition profiles). As such, it should be appreciated that unless the context requires otherwise, the claimed transition management may be applied regardless of what parameter is actually controlled by the controller.

The various described machine controller components including the torque modulation decision module, the pulse controller, the transition profile generator, the inverter controller and other control elements may be implemented, grouped, and configured in a wide variety of different architectures in different embodiments. For example, in some embodiments, the pulsed control system may be incorporated into a motor controller or an inverter controller or it may be provided as a separate component. Similarly, for a generator, the pulse controller may be incorporated into a generator controller or a rectifier controller and in combined motor/generators the pulse controller may be incorporated into a combined motor/generator controller or a combined inverter/rectifier controller. In some embodiments, the described control functionality may be implemented algorithmically in software or firmware executed on a processor—which may take any suitable form, including, for example, general purpose processors and microprocessors, DSPs, etc.

The pulsed control system may be part of a larger control system. For example, in vehicular applications, the described control may be part of a vehicle controller, a powertrain controller, a hybrid powertrain controller, or an ECU (engine control unit), etc. that performs a variety of functions related to vehicle control. In such applications, the vehicle or other relevant controller, etc. may take the form of a single processor that executes all of the required control, or it may include multiple processors that are co-located as part of a powertrain or vehicle control module or that are distributed at various locations within the vehicle. The specific functionalities performed by any one of the processors or control units may be widely varied.

The invention has been described primarily in the context of motor control and/or inverter/motor control. However, it should be appreciated that the described approach is equally applicable to generator and/or generator/rectifier control. Thus, any time that motor control is described it should be appreciated that analogous techniques can be applied to generator control. Thus, unless the context requires different interpretation, description of a feature of pulsed motor control, pulsed generator control or pulsed motor/generator control should be understood to apply equally to pulsed motor control, pulsed generator control and the pulsed control of combined motor/generators.

A variety of different control schemes can be implemented within the pulse controller. Generally, the control schemes may be implemented digitally, algorithmically, using analog components or using hybrid approaches. The pulse generator and/or the motor controller may be implemented as code executing on a processor, on programmable logic such as an FPGA (field programmable gate array), in circuitry such as an ASIC (application specific integrated circuit), on a digital signal processor (DSP), using analog components, or any other suitable piece of hardware. In some implementations, the described control schemes may be incorporated into object code to be executed on a digital signal processor (DSP) incorporated into an inverter controller (and/or rectifier controller in the context of a generator and/or a combined inverter/rectifier controller).

In various embodiments, pulse width modulation, delta conversion or other techniques may be used to create the pulsed inverter control signal 38. Regardless of the type of modulation used, the transitions between pulsing levels may be managed in the described manner. Similarly, the described pulse transition management may be used on any type of motor in which pulsed control is used regardless of the machine's time constant and/or the switching frequency used. Therefore, the present embodiments should be considered illustrative and not restrictive and the invention is not to be limited to the details given herein, but may be modified within the scope and equivalents of the appended claims.

What is claimed is:

1. A method of controlling operation of an electric machine, the method comprising:
    directing pulsed operation of the electric machine to deliver a requested average output, wherein the pulsed operation causes the electric machine to alternate between a first output level that is greater than the requested average output and a second output level that is less than the requested average output; and controlling selected transitions from the first output level to the second output level, or the second output level to the first output level using a cubic or higher order transition profile.

2. A method as recited in claim 1 wherein the transition profile is a cubic function profile.

3. A method as recited in claim 1 wherein the second output level is zero torque.

4. A method as recited in claim 3 wherein the electric machine is controlled by an inverter and in selected operating states, the inverter is turned off during at least a portion of the time that the electric machine is caused to output zero torque.

5. A method as recited in claim 1 wherein the transitions between the output levels are controlled by controlling the torque generated by the electric machine using the cubic or higher order transition profile.

6. A method as recited in claim 1 wherein the transitions between the output levels are controlled by controlling current supplied to the electric machine using the cubic or higher order transition profile.

7. A method as recited in claim 1 wherein the transition profiles are transition torque profiles.

8. A method as recited in claim 1 wherein the transition profiles are transition current profiles.

9. A method of controlling operation of an electric machine, the method comprising:
   directing pulsed operation of the electric machine to deliver a requested average output, wherein the pulsed operation causes the electric machine to alternate between a first output level that is greater than the requested average output and a second output level that is less than the requested average output; and
   controlling selected transitions between the output levels using a quintic or higher order transition profile.

10. A method as recited in claim 9 wherein the transition profile is a profile having an order that is higher than quintic.

11. A method as recited in claim 9 wherein the transition profile is a quintic function profile.

12. An electric machine controller arranged to direct operation of a power converter that controls an electric machine, the electric machine controller comprising:
   a pulsing decision module that determines when pulsed operation of the electric machine is desirable and when continuous operation of the electric machine is desirable to deliver a requested average output; and
   a pulse controller that directs the pulsed operation of the electric machine when the pulsing decision module determines that the pulsed operation of the electric machine is desirable, wherein the pulsed operation causes the electric machine to alternate between a first output level that is greater than the requested average output and a second output level that is less than the requested average output, the pulse controller including a transition profile generator that controls transitions from the second output level to the first output level using a cubic or higher order transition profile.

13. An electric machine controller as recited in claim 12 wherein the transition profile generator controls transitions from the second output level to the first output level using a quintic or higher transition profile.

14. An electric machine controller as recited in claim 12 wherein the transition profile generator controls further controls transitions from the first output level to the second output level using a cubic or higher transition profile.

15. An electric machine controller as recited in claim 12 wherein the second output level is zero torque and during pulsing in selected operating states, the power converter is turned off during at least a portion of the time that the electric machine is caused to output zero torque.

16. An electric machine controller as recited in claim 12 wherein the transition profiles are transition torque profiles.

17. An electric machine controller as recited in claim 12 wherein the transition profiles are transition current profiles.

18. An electric machine including an electric machine controller as recited in claim 12.

19. An electric machine as recited in claim 18 wherein the electric machine is an induction motor, a generator or a motor/generator.

20. A method of controlling operation of an electric machine, the method comprising:
   directing pulsed operation of the electric machine to deliver a requested average output, wherein the pulsed operation causes the electric machine to alternate between a first output level that is greater than the requested average output and a second output level that is less than the requested average output; and
   controlling transitions from the second output level to the first output level using an S-shaped commanded torque transition profile.

21. A method of controlling operation of an electric machine, the method comprising:
   directing pulsed operation of the electric machine to deliver a requested average output, wherein the pulsed operation causes the electric machine to alternate between a first output level that is greater than the requested average output and a second output level that is less than the requested average output; and
   controlling selected transitions between the output levels using a cubic or higher order transition profile, wherein transition from the first output level to the second output level are controlled in accordance with a first transition profile and transition from the second output level to the first output level are controlled in accordance with a second transition profile that is different than the first profile, both the first and second transition profiles being cubic or higher order transition profiles.

* * * * *